United States Patent [19]

Tada et al.

[11] Patent Number: 4,685,018

[45] Date of Patent: Aug. 4, 1987

[54] ARC DETECTOR FOR GAS INSULATED ELECTRICAL APPARATUS

[75] Inventors: Shoji Tada; Koji Ibuki, both of Amagasaki, Japan

[73] Assignee: Mitsubishi Denki Kabushiki Kaisha, Tokyo, Japan

[21] Appl. No.: 877,583

[22] Filed: Jun. 23, 1986

[30] Foreign Application Priority Data

Jul. 2, 1985 [JP] Japan ................................ 60-147441

[51] Int. Cl.[4] ............................................... H02H 5/00
[52] U.S. Cl. ........................................ 361/1; 361/174; 361/175
[58] Field of Search .................... 361/1, 173, 174, 175, 361/112

[56] References Cited

U.S. PATENT DOCUMENTS 3,461,443  8/1969  Vasel ............................. 361/173 X
4,369,364  1/1983  Kuntermann ..................... 250/227
4,461,571  7/1984  Killion ............................ 361/1 X Primary Examiner—A. D. Pellinen
Assistant Examiner—H. L. Williams
Attorney, Agent, or Firm—Sughrue, Mion, Zinn, Macpeak and Seas

[57] ABSTRACT

An arc detector includes a luminous diode 22 for irradiating the space within a vessel 1 containing an electrical device such as a bus bar 5 and filled with insulating gas such as $SF_6$. A shielded photo-diode 24 receives light reflected back from a fine powder 12 produced when an arc occurs, and drives an indicator 8.

7 Claims, 5 Drawing Figures

ARC DETECTOR FOR GAS INSULATED ELECTRICAL APPARATUS

BACKGROUND OF THE INVENTION

This invention relates to an arc detector for a gas insulated electrical apparatus, such as a bus bar insulated with $SF_6$ gas.

FIG. 1 shows a conventional arc detector as described in Japanese patent application publication No. 58-115370, wherein an insulating gas such as $SF_6$ fills a metal sheath or tube 1 in which a bus bar 5 is supported by spaced insulating members 51. An arc detector 2 is mounted to an aperture in the tube. When an accidental arc 4 is produced between the tube 1 and the bus bar 5, the high pressure generated at the arcing point is transmitted to the detector 2, shown in detail in FIG. 2. As may be seen therein, a movable contact 61 of a micro switch 7 engages a stationary contact 62 when a bellows 6 is expanded by the arc pressure in the tube, and the detected arc condition is signalled by an indicator 3.

With such a conventional arc detector it is difficult to accurately regulate the sensing or triggering level to accommodate different geometries and volumes of the apparatus being monitored, and to reliably respond to small pressure deviations as produced by a very weak arc.

SUMMARY OF THE INVENTION

An object of the present invention is thus to provide an improved arc detector which accurately and reliably responds to an arc condition regardless of the volume or configuration of the apparatus and the pressure level generated by the arc. This object is achieved by irradiating the space within a vessel containing an electrical device and filled with insulating gas with light. When an arc occurs a fine powder is produced in the vessel due to electrochemical reactions between the gas and the metal of the vessel and the electrical device, which reflects some of the light back onto a photo-diode or the like whose output triggers an indicating device.

DETAILED DESCRIPTION OF THE PREFERRED EMBODIMENTS

Figure 1:
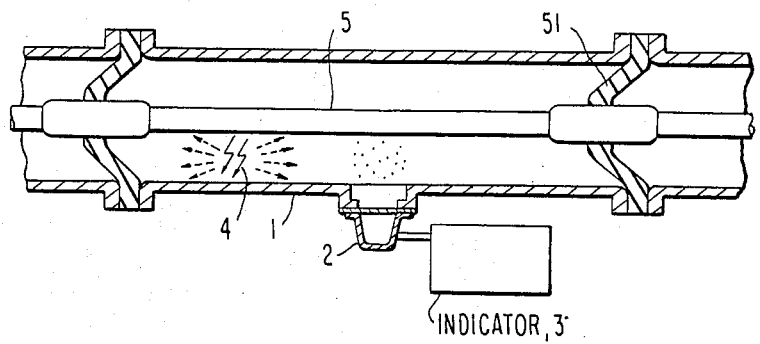
FIG. 1 shows a longitudinal sectional view of a conventional arc detector.
Figure 2:
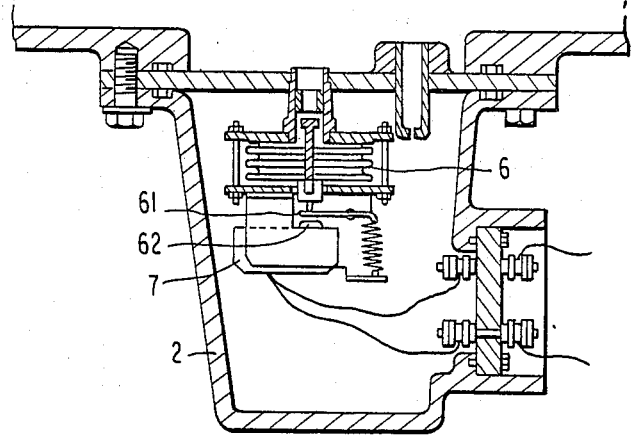
FIG. 2 shows a partially enlarged sectional view of a portion of FIG. 1.
Figure 3:
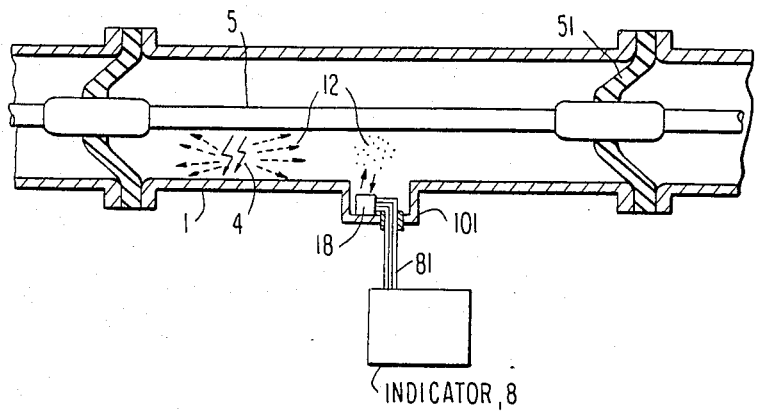
FIG. 3 shows a longitudinal sectional view of an arc detector in accordance with this invention.

In FIG. 3, wherein the same or like parts as shown in FIG. 1 are designated by corresponding reference numerals, an arc detector 18 is mounted on the bottom of a hollow compartment or chamber 101 extending outwardly from a side wall of the tube 1.

Figure 4:
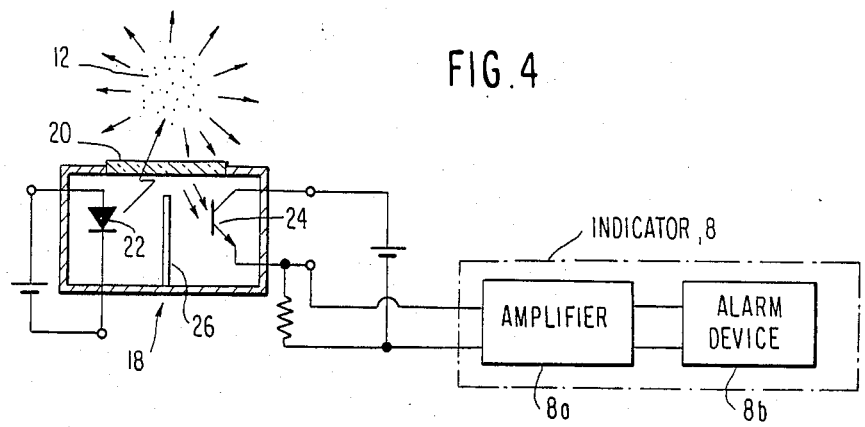
FIG. 4 shows a partially enlarged schematic sectional view of a portion of FIG. 3.

FIG. 4 shows an enlarged schematic view of the detector 18 and the output indicator 8 driven thereby, wherein a luminous diode 22 irradiates the space within the tube 1 through a window 20. When an accidental arc 4 is produced between the tube and the bus bar 5, a localized mist of fine powder 12 is formed as a result of electrochemical reactions between the $SF_6$ insulating gas and the metal forming the bus bar and the tube, which powder rapidly disperses and floats in the space within the tube. When the light from the diode 22 irradiates the fine powder above the detector compartment, a portion thereof is reflected back through the window and impinges on a photo-diode 24. The output current from the photo-diode is applied to an amplifier 8a, whose output in turn drives an alarm device or the like 8b of the indicator 8. The latter is connected to the detector 18 by cables 81.

A light shield 26 is provided between the luminous diode 22 and the photo-diode 24 to prevent the former from directly actuating the latter, and both the bus bar and the interior of the tube may be blackened to similarly avoid any spurious or false triggering of the detector.

Figure 5:
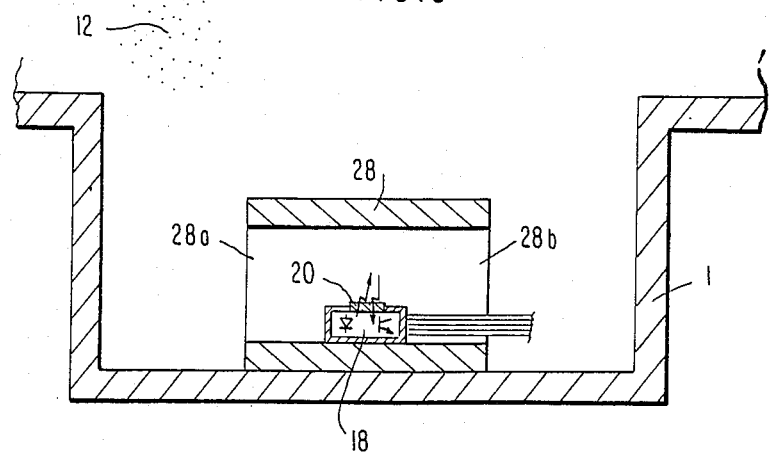
FIG. 5 shows a partially enlarged sectional view of an alternate embodiment of the invention.

FIG. 5 shows an alternate embodiment of the invention wherein the arc detector 18 is mounted in a short open tube 28 whose inner surface is roughened and blackened to absorb any incident light from the luminous diode 22. Openings 28a and 28b at both ends of the tube enable the dispersive inflow of the fine powder 12. The arrangement of FIG. 5 prevents noise light, such as incident light from the outside or reflections thereof, from entering and actuating the detector 18.

What is claimed is:

1. An arc detector (18) for an electrical apparatus, comprising:
   (a) a closed metal vessel (1),
   (b) a metal electrical device (5) disposed within the vessel and spaced from inner surfaces thereof by insulating means (51),
   (c) an insulating gas filling a space within the vessel between the inner surfaces thereof and the electrical device, wherein the occurrence of an arc between the electrical device and the vessel produces a fine reflective powder (12) in said space due to electrochemical reactions between said insulating gas and the metal of said vessel and said electrical device,
   (d) means (22) for directly irradiating said space within the vessel with light;
   (e) means (24) for directly receiving a portion of said light reflected from fine powder (12) produced upon the occurrence of an arc whereby the amount of light received by said means for receiving is increased; and
   (f) an indicator (8) responsive to an output from said light receiving means for signalling the occurrence of an arc.

2. An arc detector according to claim 1, wherein said irradiating means and said light receiving means are mounted in a chamber (101) extending outwardly from a sidewall of said vessel, said chamber being in open communication with the space within the vessel.

3. An arc detector according to claim 2, wherein said irradiating means and said light receiving means are disposed in an open ended tube (28) mounted in said chamber.

4. An arc detector according to claim 2, wherein said insulating gas is sulphur hexafluoride, said electrical device is a bus bar, said vessel is a tube surrounding the bus bar and spaced and insulated therefrom, the irradiating means is a luminous diode, the receiving means is a photo-diode, said diodes are shielded from each other by an interposed light barrier (26), and surfaces of the bus bar, tube and chamber are blackened.

5. An arc detector according to claim 3, wherein said insulating gas is sulphur hexafluoride, said electrical device is a bus bar, said vessel is a tube surrounding the bus bar and spaced and insulated therefrom, the irradiating means is a luminous diode, the receiving means is a photo-diode, said diodes are shielded from each other by an interposed light barrier (26), and surfaces of the bus bar, tubes and chamber are blackened.

6. An arc detector according to claim 4, wherein the bus bar is copper and the tube is aluminum.

7. An arc detector according to claim 5, wherein the bus bar is copper and the tube is aluminum.

* * * * *